(12) United States Patent
Zhou et al.

(10) Patent No.: US 11,888,960 B2
(45) Date of Patent: Jan. 30, 2024

(54) PACKET PROCESSING METHOD AND APPARATUS

(71) Applicant: Huawei Technologies Co., Ltd., Shenzhen (CN)

(72) Inventors: Xingwang Zhou, Nanjing (CN); Feng Li, Nanjing (CN); Jianfei He, Shenzhen (CN); Weiguang Wang, Nanjing (CN); Yi Zhang, Moscow (RU); Yizhou Li, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 273 days.

(21) Appl. No.: 17/232,832

(22) Filed: Apr. 16, 2021

(65) Prior Publication Data

US 2021/0234945 A1    Jul. 29, 2021

Related U.S. Application Data

(63) Continuation of application No. PCT/CN2019/111863, filed on Oct. 18, 2019.

(30) Foreign Application Priority Data

Oct. 19, 2018   (CN) .......................... 201811223687.X

(51) Int. Cl.
*H04L 29/06*     (2006.01)
*H04L 69/22*     (2022.01)
(Continued)

(52) U.S. Cl.
CPC ............ *H04L 69/22* (2013.01); *H04L 1/1607* (2013.01); *H04L 1/1642* (2013.01); *H04L 1/188* (2013.01); *H04L 45/74* (2013.01); *H04L 47/34* (2013.01)

(58) Field of Classification Search
CPC ..... H04L 69/22; H04L 1/1607; H04L 1/1642; H04L 1/188; H04L 45/74; H04L 47/34;
(Continued)

(56) References Cited

U.S. PATENT DOCUMENTS 9,007,915 B2    4/2015   Bajpai et al.
2008/0137585 A1*   6/2008   Loyola .................... H04L 1/06
                                                           370/315
(Continued)

FOREIGN PATENT DOCUMENTS

CN     103024930 A     4/2013
CN     103259696 A     8/2013
(Continued)

OTHER PUBLICATIONS

Chung, S-H. et al., "Analysis of Bursty Packet Loss Characteristics on Underutilized Links Using SNMP", 2004, 7 pages.
(Continued)

*Primary Examiner* — Vinncelas Louis
(74) *Attorney, Agent, or Firm* — Slater Matsil, LLP

(57) ABSTRACT

A system and method for packet processing, the method being applied to a first network device and including sending a first packet to a second network device, where a control packet header of the first packet includes a first number, and the first number indicates a number of a packet that carries the first number and that is between the first network device and the second network device, and receiving a first acknowledgement packet from the second network device, where the first acknowledgement packet comprises an indication indicating whether the second network device receives the first packet.

19 Claims, 5 Drawing Sheets

(51) Int. Cl.
*H04L 1/1607* (2023.01)
*H04L 1/1867* (2023.01)
*H04L 45/74* (2022.01)
*H04L 47/34* (2022.01)

(58) Field of Classification Search
CPC ..... H04L 1/1685; H04L 47/283; H04L 69/28; H04L 1/1867; H04L 1/1896; H04L 1/06; H04B 7/15528
See application file for complete search history.

(56) References Cited

U.S. PATENT DOCUMENTS

| | | |
|---|---|---|
| 2010/0182911 A1 | 7/2010 | Pullen et al. |
| 2010/0232437 A1 | 9/2010 | Bajpai et al. |
| 2012/0213055 A1* | 8/2012 | Bajpai ................. H04L 1/1896 370/216 |
| 2015/0023213 A1* | 1/2015 | Soneda ................. H04L 45/20 370/254 |
| 2016/0119086 A1 | 4/2016 | Le et al. |
| 2021/0184994 A1* | 6/2021 | Wang ................. H04B 7/15528 |

FOREIGN PATENT DOCUMENTS

| | | |
|---|---|---|
| CN | 103503509 A | 1/2014 |
| CN | 103618678 A | 3/2014 |
| CN | 102158409 B * | 9/2014 |
| CN | 104038322 A | 9/2014 |
| CN | 108023758 A | 5/2018 |
| JP | 2005110294 A | 4/2005 |
| JP | 2007208635 A | 8/2007 |
| WO | 2011020229 A1 | 2/2011 |
| WO | 2011074454 A1 | 6/2011 |
| WO | 2012141648 A2 | 10/2012 |
| WO | 2018082382 A1 | 5/2018 |

OTHER PUBLICATIONS

Information Sciences Institute, "Transmission Control Protocol; DARPA Internet Program; Protocol Specification", RFC 793, Sep. 1981, 91 pages.

Ramakrishnan, K. et al., "The Addition of Explicit Congestion Notification (ECN) to IP", RFC 3168, Network Working Group, Sep. 2001, 63 pages.

Henderson, T. et al., "The NewReno Modification to TCP's Fast Recovery Algorithm", RFC 6582, Internet Engineering Task Force (IETF), Apr. 2012, 16 pages.

Wang, C. et al., "A Survey of Transport Protocols for Wireless Sensor Networks", IEEE Network, vol. 20, No. 3, May/Jun. 2006, pp. 34-40.

* cited by examiner

PACKET PROCESSING METHOD AND APPARATUS

CROSS-REFERENCE TO RELATED APPLICATIONS

This application is a continuation of International Application No. PCT/CN2019/111863, filed on Oct. 18, 2019, which claims priority to Chinese Patent Application No. 201811223687.X, filed on Oct. 19 2018. The disclosures of the aforementioned applications are hereby incorporated by reference in their entireties.

TECHNICAL FIELD

This application relates to the field of communications technologies, and in particular, to a data processing method and an apparatus.

BACKGROUND

Currently, a network application mainly includes hosts (such as personal computers, mobile phones, or servers) at both ends and an intermediate network (such as a wired or wireless network). Data exchanged between the hosts is transmitted via the intermediate network. Data transmission control (such as packet loss-triggered retransmission and rate control) is implemented by the host without participation of the intermediate network in the control. The intermediate network only provides a best-effort and stateless forwarding service.

In the prior art, a transmit end host estimates a network status based on an acknowledgement packet returned by a receive end host, and then adjusts a sending rate. This mechanism is misjudgment-prone, and consequently a transmission control effect is poor.

SUMMARY

Embodiments of the present invention provide a packet processing method and an apparatus, to resolve a packet transmission control problem in the prior art.

According to a first aspect, a packet processing method is applied to a first network device. The first network device sends a first packet to a second network device, where a control packet header of the first packet includes a first number, and the first number is used to indicate a number of the packet that carries the first number and that is between the first network device and the second network device, and the first network device receives a first acknowledgement packet from the second network device, where the first acknowledgement packet includes an indication indicating whether the second network device receives the first packet.

In this embodiment of the present invention, based on a number of a packet between the first network device and the second network device and an acknowledgement packet between the first network device and the second network device, packet transmission between the network devices can be effectively controlled.

In a possible design, the method further includes re-sending the first packet to the second network device.

In this embodiment of the present invention, when a packet loss or a possible packet loss is found, the first network device may retransmit the first packet, to perform inband and timely recovery on a service impairment between the first network device and the second network device. This ensures reliability and timeliness of service transmission.

In a possible design, before the re-sending the first acknowledgement packet to the second network device, the method further includes the first acknowledgement packet includes an indication indicating that the second network device does not receive the first packet, or a timer for the first packet expires, and no acknowledgement packet from the second network device is received.

In this embodiment of the present invention, retransmission may be triggered based on a definite acknowledgement packet, or may be triggered based on a retransmission timer and an acknowledgement packet.

In a possible design, the first packet includes retransmission indication information, the retransmission indication information is used to indicate whether the second network device is allowed to retransmit the first packet, and a re-sent first packet includes updated retransmission indication information.

In this embodiment of the present invention, to comprehensively consider an end-to-end latency of a service or a retransmission mechanism of an upper-layer transmission protocol, retransmission between network devices is limited by using a retransmission indication information field. When retransmission occurs, a retransmission indication information field of a retransmitted packet is updated, to avoid excessive retransmission or meaningless retransmission.

In a possible design, the method further includes obtaining a status of a network between the first network device and the second network device based on the first acknowledgement packet.

In this embodiment of the present invention, the status of the network between the first network device and the second network device can be obtained based on an acknowledgement packet, to guide subsequent path selection, multipath concurrency decision, multipath load sharing decision, and the like.

In a possible design, the control packet header of the first packet further includes a timestamp of the first number, the timestamp of the first number is used to indicate a time point at which the first network device sends the first packet, and a re-sent first packet includes an updated timestamp of the first number.

In this embodiment of the present invention, the timestamp of the first number is used to indicate the time point at which the first network device sends the first packet, and the timestamp may be used to calculate a round-trip time latency between the first network device and the second network device. When retransmission occurs, to ensure accuracy of round-trip time latency calculation, a field indicating a timestamp of a first number of a retransmitted packet is updated.

In a possible design, the control packet header of the first packet further includes a forwarding path field and a field indicating a location of the first network device on a forwarding path.

In this embodiment of the present invention, the forwarding path field in the control packet header and the field indicating the location of the first network device on the forwarding path may be used to indicate a subsequent network device to forward a packet along a specified path, to facilitate transmission control.

In a possible design, the control packet header of the first packet further includes a tunnel type field, and packets of different tunnel types correspond to different first number queues.

In this embodiment of the present invention, service packets of a same type are converged into one tunnel for transmission control. This reduces to-be-maintained path statuses of the service packets, the service packets can be maintained at a large granularity level, and it is easy to implement transmission.

In a possible design, the first packet further includes an internet protocol (IP) packet header, the control packet header is an upper-layer packet header of the IP packet header, a source IP address of the IP packet header is an IP address of the first network device, and a destination IP address of the IP packet header is an IP address of the second network device.

In this embodiment of the present invention, the IP packet header is encapsulated at a lower layer of the control packet header. In this way, an existing advantage and an existing infrastructure investment of an IP network can be inherited. This greatly facilitates large-scale commercial use.

In a possible design, a packet header of the first packet further includes a second number, and the second number is used to indicate a number of the packet that carries the second number and that is between a third network device and a fourth network device.

In this embodiment of the present invention, a network device may perform two-layer transmission control. If overlay edge node-overlay edge node-level (OE-OE-level) transmission control is performed for the first number, overlay node-overlay node-level (ON-ON-level) transmission control is performed for the second number is. If the ON-ON-level transmission control is performed for the first number, the OE-OE-level transmission control is performed for the second number. If the first network device is an ingress edge network device, the first network device and the third network device are a same network device, that is, both the ON-ON-level transmission control and the OE-OE-level transmission control are performed.

In a possible design, the packet header of the first packet further includes a timestamp of the second number, and the timestamp of the second number is used to indicate a time point at which the third network device sends the packet that carries the second number.

In a possible design, the third network device and the first network device are a same network device, the fourth network device and the second network device are different network devices, and the fourth network device is located between the first network device and the second network device, or the second network device is located between the first network device and the fourth network device, and the method further includes receiving a second acknowledgement packet from the fourth network device, where the second acknowledgement packet includes an indication indicating whether the fourth network device receives the first packet.

In a possible design, the method further includes re-sending the first packet to the fourth network device.

In a possible design, before the re-sending the first packet to the fourth network device, the method further includes the second acknowledgement packet includes an indication indicating that the fourth network device does not receive the first packet, or a timer for the first packet expires, and no acknowledgement packet from the fourth network device is received.

In a possible design, the first packet includes retransmission indication information, the retransmission indication information is used to indicate whether the fourth network device is allowed to retransmit the first packet, and a re-sent first packet includes updated retransmission indication information.

In a possible design, the method further includes obtaining a status of a network between the first network device and the fourth network device based on the second acknowledgement packet.

In a possible design, the third network device and the first network device are a same network device, the second network device is a network device on a first path between the first network device and the fourth network device, a fifth network device is a network device on a second path between the first network device and the fourth network device, and the method further includes sending a fifth packet to the fifth network device, where a control packet header of the fifth packet includes a fifth number and the second number, the fifth number is used to indicate a number of the packet that carries the fifth number and that is between the first network device and the fifth network device, and payloads of the first packet and the fifth packet are the same.

In this embodiment of the present invention, transmission control between the first network device and the fourth network device is the OE-OE-level transmission control, transmission control between the first network device and the second network device is the ON-ON-level transmission control, and transmission control between the first network device and the fifth network device is the ON-ON-level transmission control. A packet may be transmitted between the first network device and the fourth network device by using two paths. The first path passes through the second network device, and the second path passes through the fifth network device. If redundant concurrent transmission is performed by using the first path and the second path, the payloads of the first packet and the fifth packet are the same. If load sharing transmission is performed by using the first path and the second path, the payloads of the first packet and the fifth packet are different.

In a possible design, the third network device and the first network device are different network devices, the first network device is located between the third network device and the fourth network device, and before the sending a first packet to a second network device, the method further includes receiving a second packet from an upstream network device, where a control packet header of the second packet includes the second number and a third number, and the third number is used to indicate a number of the packet that carries the third number and that is between the upstream network device and the first network device, and modifying the third number in the control packet header of the second packet to the first number, to obtain the first packet.

In this embodiment of the present invention, transmission control between the first network device and the fourth network device is the OE-OE-level transmission control, transmission control between the first network device and the second network device is the ON-ON-level transmission control, and transmission control between the upstream network device and the first network device is the ON-ON-level transmission control.

In a possible design, the method further includes sending a third acknowledgement packet to the upstream network device, where the third acknowledgement packet includes an indication indicating whether the second network device receives the second packet.

In a possible design, the control packet header of the second packet further includes an accumulated round-trip time latency field, and the obtaining the first packet further includes updating the accumulated round-trip time latency field in the control packet header of the second packet based on a round-trip time latency between the first network device and the second network device, to obtain the first packet.

According to a second aspect, a packet processing method is applied to a second network device and includes receiving a first packet from a first network device, where a control packet header of the first packet includes a first number, and the first number is used to indicate a number of the packet that carries the first number and that is between the first network device and the second network device, and sending a first acknowledgement packet to the first network device, where the first acknowledgement packet includes an indication indicating whether the second network device receives the first packet.

In a possible design, the control packet header of the first packet further includes a timestamp of the first number, and the timestamp of the first number is used to indicate a time point at which the first network device sends the first packet.

In a possible design, the control packet header of the first packet further includes the first number and the timestamp of the first number.

According to a third aspect, a network device is provided. The network device is a first network device and includes a sending module, configured to send a first packet to a second network device, where a control packet header of the first packet includes a first number, and the first number is used to indicate a number of the packet that carries the first number and that is between the first network device and the second network device, and a receiving module, configured to receive a first acknowledgement packet from the second network device, where the first acknowledgement packet includes an indication indicating whether the second network device receives the first packet.

In a possible design, the sending module is further configured to re-send the first packet to the second network device.

In a possible design, the first packet includes retransmission indication information, the retransmission indication information is used to indicate whether the second network device is allowed to retransmit the first packet, and a re-sent first packet includes updated retransmission indication information.

In a possible design, the device further includes a processor, configured to obtain a status of a network between the first network device and the second network device based on the first acknowledgement packet.

In a possible design, the control packet header of the first packet further includes a timestamp of the first number, the timestamp of the first number is used to indicate a time point at which the first network device sends the first packet, and a re-sent first packet includes an updated timestamp of the first number.

In a possible design, the control packet header of the first packet further includes a forwarding path field and a field indicating a location of the first network device on a forwarding path.

In a possible design, the control packet header of the first packet further includes a tunnel type field, and packets of different tunnel types correspond to different first number queues.

In a possible design, the first packet further includes an IP packet header, the control packet header is an upper-layer packet header of the IP packet header, a source IP address of the IP packet header is an IP address of the first network device, and a destination IP address of the IP packet header is an IP address of the second network device.

In a possible design, a packet header of the first packet further includes a second number, and the second number is used to indicate a number of the packet that carries the second number and that is between a third network device and a fourth network device.

In a possible design, the packet header of the first packet further includes a timestamp of the second number, and the timestamp of the second number is used to indicate a time point at which the third network device sends the packet that carries the second number.

In a possible design, the third network device and the first network device are a same network device, the fourth network device and the second network device are different network devices, and the fourth network device is located between the first network device and the second network device, or the second network device is located between the first network device and the fourth network device, and the receiving module is further configured to receive a second acknowledgement packet from the fourth network device, where the second acknowledgement packet includes an indication indicating whether the fourth network device receives the first packet.

In a possible design, the sending module is further configured to re-send the first packet to the fourth network device.

In a possible design, the first packet includes retransmission indication information, the retransmission indication information is used to indicate whether the fourth network device is allowed to retransmit the first packet, and a re-sent first packet includes updated retransmission indication information.

In a possible design, the device further includes a processor, configured to obtain a status of a network between the first network device and the fourth network device based on the second acknowledgement packet.

In a possible design, the third network device and the first network device are a same network device, the second network device is a network device on a first path between the first network device and the fourth network device, a fifth network device is a network device on a second path between the first network device and the fourth network device, and the sending module is further configured to send a fifth packet to the fifth network device, where a control packet header of the fifth packet includes a fifth number and the second number, the fifth number is used to indicate a number of the packet that carries the fifth number and that is between the first network device and the fifth network device, and payloads of the first packet and the fifth packet are the same.

In a possible design, the receiving module is further configured to receive a second packet from an upstream network device, where a control packet header of the second packet includes the second number and a third number, and the third number is used to indicate a number of the packet that carries the third number and that is between the upstream network device and the first network device, and the processor is further configured to modify the third number in the control packet header of the second packet to the first number, to obtain the first packet.

In a possible design, the sending module is further configured to send a third acknowledgement packet to the upstream network device, where the third acknowledgement packet includes an indication indicating whether the second network device receives the second packet.

In a possible design, the processor is further configured to update an accumulated round-trip time latency field in the control packet header of the second packet based on a round-trip time latency between the first network device and the second network device, to obtain the first packet.

According to a fourth aspect, a second network device is provided and includes a receiving module, configured to receive a first packet from a first network device, where a control packet header of the first packet includes a first number, and the first number is used to indicate a number of the packet that carries the first number and that is between the first network device and the second network device, and a sending module, configured to send a first acknowledgement packet to the first network device, where the first acknowledgement packet includes an indication indicating whether the second network device receives the first packet.

In a possible design, the control packet header of the first packet further includes a timestamp of the first number, and the timestamp of the first number is used to indicate a time point at which the first network device sends the first packet.

In a possible design, the control packet header of the first packet further includes the first number and the timestamp of the first number.

According to a fifth aspect, this application provides a chip, including a processor and a transceiver, configured to perform the method described in any one of the first aspect or the designs of the first aspect.

According to a sixth aspect, this application provides a chip, including a processor and a transceiver, configured to perform the method described in any one of the second aspect or the designs of the second aspect.

According to a seventh aspect, this application provides a computer-readable storage medium, including an instruction. When the instruction is run on a network device, the network device is enabled to perform the method described in any one of the first aspect or the designs of the first aspect.

According to an eighth aspect, this application provides a computer-readable storage medium, including an instruction. When the instruction is run on a network device, the network device is enabled to perform the method described in any one of the second aspect or the designs of the second aspect.

According to a ninth aspect, this application provides a computer program product. When the computer program product runs on a network device, the network device is enabled to perform the method described in any one of the first aspect or the designs of the first aspect.

According to a tenth aspect, this application provides a computer program product. When the computer program product runs on a network device, the network device is enabled to perform the method described in any one of the second aspect or the designs of the second aspect.

DETAILED DESCRIPTION OF ILLUSTRATIVE EMBODIMENTS

To make the objectives, technical solutions, and advantages of the present invention clearer and more comprehensible, the following further describes the present invention in detail with reference to the accompanying drawings and embodiments.

To facilitate understanding of the solutions in the embodiments of this application, concepts and related technologies in this application are first described.

Packet numbering: Numbering is performed based on a packet. Packets may be sequentially numbered in a natural number range, may be sequentially numbered in an odd number range, may be sequentially numbered in an even number range, may be periodically numbered in a range of a given quantity of natural numbers, or may even be numbered in a non-sequential manner, provided that a transmit end and a receive end agree on a numbering manner through coordination. This is not limited in the present invention. When the numbering is performed based on the packet, a number of a next packet is irrelevant to a size of a current packet.

Tunnel type: Packets of different tunnel types correspond to different number queues. A number of a packet between a first network device and a second network device is used as an example. For a packet of a low-latency tunnel type, a packet number of a next packet is 10, and for a type of a high-throughput tunnel type, a packet number of a next packet is 5. In this way, different transmission control policies may be used for different tunnel types. For example, for the packet of the low-latency tunnel type, packet loss-triggered retransmission is not performed between the first network device and the second network device. For the packet of the high-throughput tunnel type, packet loss-triggered retransmission is performed between the first network device and the second network device.

Figure 1:
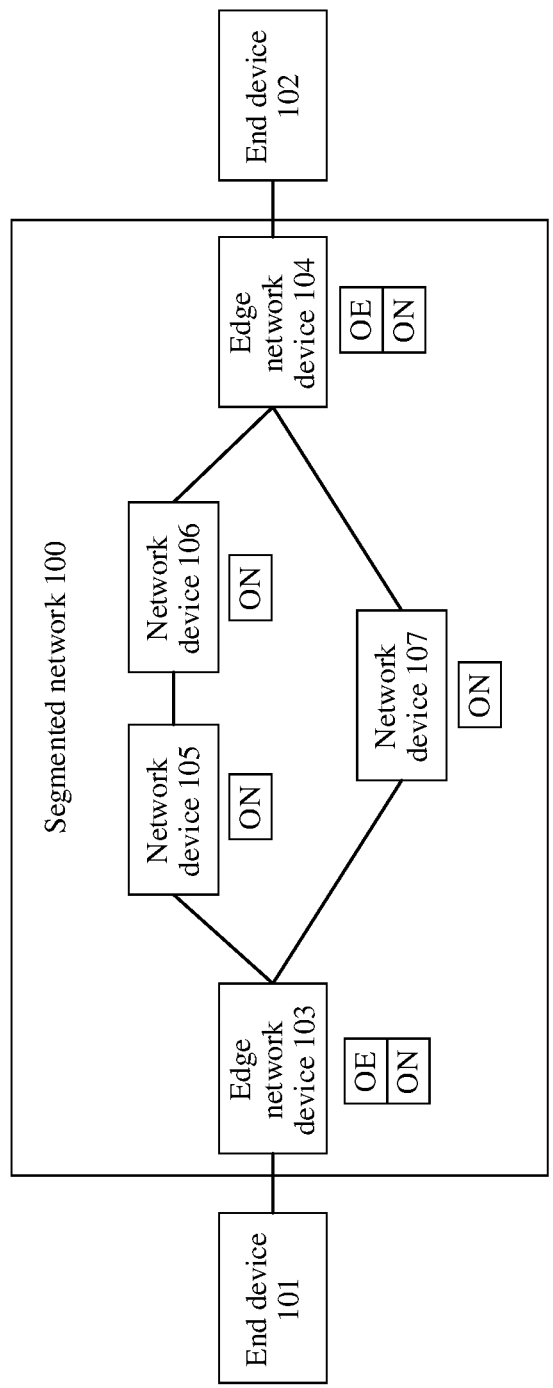
FIG. 1 is a schematic structural diagram of a system according to an embodiment of the present invention.

FIG. 1 is a schematic structural diagram of a system according to an embodiment of the present invention. The system includes an end device 101, an end device 102, a network device 103, a network device 104, a network device 105, a network device 106, and a network device 107. The network devices 103 to 107 constitute a segmented network 100. The end device 101 sends a service packet to the end device 102 by using the segmented network 100. Certainly, another network may be further included between the end devices 101 and 102, for example, another segmented network or a conventional IP network may be included. The segmented network 100 in FIG. 1 is merely an example. A segmented network in actual application may be more complex or simpler.

The end device 101 sends the service packet to the end device 102 by using the segmented network 100. In the segmented network 100, there are two paths between the network device 103 and the network device 104. A first path is the network device 103-the network device 105-the network device 106-the network device 104, and a second path is the network device 103-the network device 107-the network device 104. The service packet sent by the end device 101 may be sent to the end device 102 by using the first path, or may be sent to the end device 102 by using the second path.

The end device 101 may be a transmit end host, and the end device 102 may be a receive end host. In this embodiment of the present invention, the network devices 103 to 107 may participate in transmission control. The network device 103 may monitor a status of the first path and a status of the second path, and further select a packet forwarding path based on the path statuses. The network device 103 may perform multipath redundant transmission, to concurrently transmit the service packet by using the first path and the second path. The concurrent transmission may be completely repeated multipath packet sending, or may be concurrent transmission in a manner such as through multipath forward error correction (FEC) or multipath network coding. The network device 103 may alternatively perform load sharing by using the first path and the second path, to transmit a part of the service packet by using the first path and transmit the other part of the service packet by using the second path.

It is assumed that the network device 103 sends the service packet by using the first path. The network device 103 may retransmit the packet based on a feedback of a subsequent network device, for example, may retransmit the packet based on a feedback of the network device 104. The network device 105 may also retransmit the packet based on a feedback of a subsequent network device, for example, may retransmit the packet based on a feedback of the network device 106.

In this embodiment of the present invention, the network device 103 is used as an ingress edge network device, and the network device 104 is used as an egress edge network device. Control between the ingress edge network device and the egress edge network device is referred to as control between overlay edge nodes (OE), and control between other network devices is referred to as control between overlay nodes (ON). The segmented network 100 mainly includes two functional entities: an OE and an ON. The OE is configured to ensure reliability of data between the OEs, that is, perform the control between the OEs. The ON is configured to ensure reliability of data between the ONs, that is, perform the control between the ONs. The OE and the ON may be separately deployed, or may be deployed in a same network device. For example, the network devices 103 and 104 each include the functional entity OE and the functional entity ON, and the network devices 105 to 107 include only the functional entity ON. In the following embodiment, two-layer transmission control, namely OE-OE transmission control and ON-ON transmission control, is used for description. In a possible design, only single-layer transmission control may be used.

The network device 103, namely the ingress edge network device, may converge, based on a service packet type, service packets of a similar type (for example, service packets requiring a high throughput, service packets requiring a low latency, or service packets requiring a low packet loss rate) into a same tunnel for converged transmission and control. Services of different types are separately transmitted. In this way, differentiated transmission control policies can be effectively used for the services of different types. For ease of description, in this embodiment of the present invention, three tunnel types are provided: a low-latency tunnel, a high-throughput tunnel, and a latency-throughput tunnel (a tunnel with equal emphasis placed on both latency and throughput). Different tunnel types correspond to different transmission control policies such as multipath utilization and retransmission. In this embodiment of the present invention, the converged transmission means that service packets from different end devices may be converged for transmission.

The network device 103 constructs a tunnel packet based on the service packet, specifically, uses the original service packet as a payload and adds a control packet header to obtain the tunnel packet. A payload in one tunnel packet may include one service packet, may include a plurality of service packets, or may even include some data of one service packet, where other data of the service packet may be encapsulated into a payload of another tunnel packet. The network device 103 encapsulates the service packet, uses the original service packet as a packet payload, adds a control packet header, and adds different control information to the control packet header based on a service type and the like, to execute different transmission control policies. The original service packet may be a service packet including a layer-3 packet header, a layer-4 packet header, or the like.

The following provides description by using an example in which the network device 103 forwards a packet to the network device 104 by using the first path. Transmission control between the network device 103 and the network device 104 is the OE-OE-level transmission control, transmission control between the network device 103 and the network device 105 is the ON-ON-level transmission control, transmission control between the network device 105 and the network device 106 is the ON-ON-level transmission control, transmission control between the network device 106 and the network device 104 is the ON-ON-level transmission control, and there are three segments of ON-ON-level transmission control between the network device 103 and the network device 104.

The OE-OE-level transmission control mainly includes OE-OE-level retransmission, order preserving, redundancy removal, reordering, and the like. The ON-ON-level transmission control mainly includes hop-by-hop retransmission, and the like. Retransmission persistence is determined by factors such as an OE-OE-level round-trip time latency, a service latency tolerance, and a retransmission mechanism of an upper-layer transmission protocol (for example, transmission control protocol (TCP)). A persistence value needs to be set based on the service latency tolerance, or a persistence value needs to be set based on the upper-layer transmission protocol. That is, not only an ON-ON retransmission function needs to be fully used, but also it needs to be ensured that the persistence value does not conflict with the upper-layer transmission protocol (or the service latency tolerance).

TABLE 1

| 0 | 1 | 2 | 3 |
|---|---|---|---|
| Version (4 bits) + time to live (4 bits) | Packet header length (16 bits) | | Message type (8 bits) |
| ON-ON-level packet number (32 bits) | | | |
| Timestamp of the ON-ON-level packet number (32 bits) | | | |
| Tunnel type (8 bits) | Path ID (8 bit) | Current hop (8 bit) | Retransmission indication (8 bit) |
| Retransmission indication (8 bits) | OE-OE-level round-trip time latency (16 bit) | | |
| OE-OE-level packet number (32 bits) | | | |
| Timestamp of the OE-OE-level packet number (32 bits) | | | |
| Hop list (16 bits per hop) | | | |

Table 1 shows a control packet header provided in an embodiment of the present invention. The control packet header is a control packet header in the packet that is sent by the network device 103 to the network device 104 by using the first path. Various fields in the control packet header are described as follows.

Version: a protocol version number.

Time to live (TTL): The TL decreases by 1 hop by hop. If the TTL is 0, the packet is discarded.

Message type: In this embodiment of the present invention, five message types are mainly defined: a forwarding data (FORWARD_DATA) type, an ON-ON-level acknowledgement (ACK) type, an ON-ON-level negative acknowledgement (NACK) type, an OE-OE-level ACK type, and an OE-OE-level NACK type.

ON-ON-level packet number: an ON-ON-level hop-by-hop packet number that is modified hop by hop. The number is used to ensure reliability between hops. When the network device 103 sends a packet to the network device 105, the field is set based on a number of a packet between the network device 103 and the network device 105. After receiving the packet, the network device 105 needs to modify the field based on a number of a packet between the network device 105 and the network device 106.

Timestamp of the ON-ON-level packet number: a timestamp when a packet is forwarded on an ON node. The timestamp is modified hop by hop and is used to calculate an RTT between hops. When sending a packet to the network device 105, the network device 103 sets the field. After receiving the packet, the network device 105 needs to modify both the field and the ON-ON-level packet number field.

Tunnel type: filled by a service start point OE1 based on a service type. In this embodiment, three tunnel type templates are formulated for service selection (a low-latency tunnel type template, a high-throughput tunnel type template, and a latency-throughput tunnel type template). Different tunnel types correspond to different multipath (E-to-E path) utilization and retransmission policies. The tunnel type template can be expanded.

Path ID: an ID of a path in a tunnel. One tunnel may include a plurality of paths. The path ID is generated by an OE node and is used during detouring (detour). The OE node can find, by using the ID, a specific path that needs to be detoured.

Current hop (cur hop): a location of a current network device in a forwarding path list.

Retransmission indication: used to indicate whether a network device that receives a corresponding packet is allowed to perform a retransmission operation. In this embodiment of the present invention, the retransmission persistence (retransmit persistence) is used to indicate whether ON-ON retransmission is allowed. The retransmit persistence indicates available total ON-ON retransmission duration. For example, if a unidirectional latency tolerance limit of a voice application is 150 ms and a current OE-OE latency is 100 ms, the available total ON-ON retransmission duration is 50 ms. A retransmission time spent between any two ONs needs to be subtracted from 50 ms. When remaining duration is 0, subsequent ONs do not perform hop-by-hop retransmission. For another example, a service such as a mobile game has a relatively low requirement for network bandwidth but has a relatively strict requirement for a latency and a packet loss. A multipath parallel sending process is enabled for the service by default in a segmented network, a packet loss rate is reduced and a response speed is increased through multipath redundant sending, and no ON-ON retransmission needs to be enabled. In a possible design, the retransmission indication field may be directly set to retransmission allowed or retransmission not allowed, instead of implicitly indicating, by using the retransmission persistence, whether retransmission is allowed. For example, for some service packets that do not have a latency requirement but have a relatively high reliability requirement, the retransmission indication field may be directly set to retransmission allowed, and an intermediate forwarding node does not modify this field either, and always allows retransmission.

OE-OE-level round-trip time latency (RTT): referred to as an accumulated round-trip time latency in this embodiment. An RTT of each path between OEs is obtained by accumulating RTs of all ON-ON segments on the path. When forwarding a packet, each ON node adds an RTT of a current ON-ON segment to this field.

OE-OE-level packet number: The packet number remains unchanged during transmission. This number is used for OE-OE-level order preserving, redundancy removal, reordering, packet loss detection, and the like.

Timestamp of the OE-OE-level packet number: a time point at which the network device 103 sends the packet.

Hop list: an ordered list of nodes on a forwarding path. The list is generated by an OE node by searching a routing table based on source and destination addresses of a service and a service feature.

After receiving the packet sent by the network device 103, the network device 105 feeds back an acknowledgement packet based on the ON-ON-level packet number in the packet. Table 2 shows an acknowledgement packet header provided in an embodiment of the present invention. Various fields in the acknowledgement packet header are described as follows.

Functions of a version field, a time to live field, a packet header length field, and a message type field are similar to those in Table 1.

ON-ON-level acknowledgement packet number: a maximum packet number received by the network device 105.

ON-ON-level echo timestamp: a timestamp of an ON-ON-level packet number carried in a FORWARD_DATA packet that triggers the acknowledgement packet, and is fed back to the network device 103 without being changed.

Quantity of negative acknowledgement packets: a quantity of packets that are not received before the maximum packet number.

List of the negative acknowledgement packets: a list of the packets that are not received before the maximum packet number.

The control packet header in Table 1 is merely an example control packet header. In a possible design, a field in the control packet header may be added, reduced, or modified. For example, the ON-ON-level packet number field and the field indicating the timestamp of the ON-ON-level packet number may not be included. Alternatively, the OE-OE-level packet number field and the field indicating the timestamp of the OE-OE-level packet number may not be included.

TABLE 2

| 0 | 1 | 2 | 3 |
|---|---|---|---|
| Version (4 bits) + time to live (4 bits) | Packet header length (16 bits) | | Message type (8 bits) |
| ON-ON-level acknowledgement packet number (32 bits) | | | |
| ON-ON-level echo timestamp (32 bits) | | | |
| Quantity of negative acknowledgement packets (16 bits) | | List of the negative acknowledgement packets (32 bits included in each packet) | |

After receiving the packet sent by the network device 103, the network device 104 feeds back an acknowledgement packet based on the OE-OE-level packet number in the packet. Table 3 shows an acknowledgement packet header provided in an embodiment of the present invention. Various fields in the acknowledgement packet header are described as follows.

Functions of a version field, a time to live field, a packet header length field, a message type field, and a tunnel type field are similar to those in Table 1.

Path quantity: a quantity of paths between OEs for packet transmission.

OE-OE-level acknowledgement packet number: a maximum packet number received by the network device 104.

OE-OE-level echo timestamp: a timestamp of an OE-OE-level packet number carried in a FORWARD_DATA packet that triggers the acknowledgement packet, and is fed back to the network device 103 without being changed.

Quantity of negative acknowledgement packets: a quantity of packets that are not received before the maximum packet number.

List of the negative acknowledgement packets: a list of the packets that are not received before the maximum packet number.

Path attribute: an attribute of each path, such as a packet loss rate and an RTT. The path attribute is brought back to the network device 103 for determining a network status of the path.

TABLE 3

| 0 | 1 | 2 | 3 |
|---|---|---|---|
| Version (4 bits) + time to live (4 bits) | Packet header length (16 bits) | | Message type (8 bits) |
| Tunnel type | Path quantity | | OE-OE-level RTT (16 bit) |
| OE-OE-level acknowledgement packet number (32 bits) | | | |
| OE-OE-level echo timestamp (32 bits) | | | |
| Quantity of negative acknowledgement packets (16 bits) | | List of the negative acknowledgement packets (32 bits included in each packet) | |
| Path attribute (32 bits included in an attribute of each path) | | | |

The acknowledgement packets in Table 2 and Table 3 are merely example acknowledgement packets. In a possible implementation, the acknowledgement packet may not include the received maximum packet number, and includes only a number of a desired packet to be received. In this way, a sending node is implicitly notified of a number of a packet that has been received, or implicitly notified of a number of a packet that has not been received. For a packet with a packet number, an acknowledgement packet may indicate whether a receiving node receives the packet with the packet number. The indication may be direct, for example, may indicate that packets whose packet numbers are 1 to 10 and 12 to 20 are received and a packet whose packet number is 11 is not received. Alternatively, only that packets whose packet numbers are 1 to 10 and 12 to 20 are received is indicated, and a sending node may obtain, based on this, a packet that is not received. Alternatively, only that a packet whose packet number is 11 is not received is indicated, and a sending node may obtain, based on this, a packet that may have been received.

In this embodiment of the present invention, an edge node in the segmented network converges service flows of a similar type into a same tunnel based on a service type, maintains transmission control from a service start point to a service end point in the segmented network, and provides functions of order preserving, retransmission, redundancy removal, and reordering for a service in an "end-to-end" manner. In addition to the end-to-end transmission control from the service start point to the service end point, the segmented network may further guarantees segmented transmission for the service. Each segment of transmission is stateful. The segmented network performs inband and timely recovery on a perceived service impairment based on these statuses. The end-to-end transmission control and segmented transmission control may be performed together to enhance transmission for the service. The segmented network may execute different multipath transmission policies based on the service type. When the service type is a low-latency type and a packet loss tolerance is low, the segmented network may perform multipath redundant transmission for the service, to reduce an end-to-end packet loss rate of the service. When the service type is a high-throughput type, the segmented network may perform multipath concurrent transmission for the service, to improve an end-to-end transmission throughput.

In the following embodiment, different transmission control policies are used for different service types. For ease of description, control packet headers in use are the control packet headers in Table 1 to Table 3.

Figure 2:
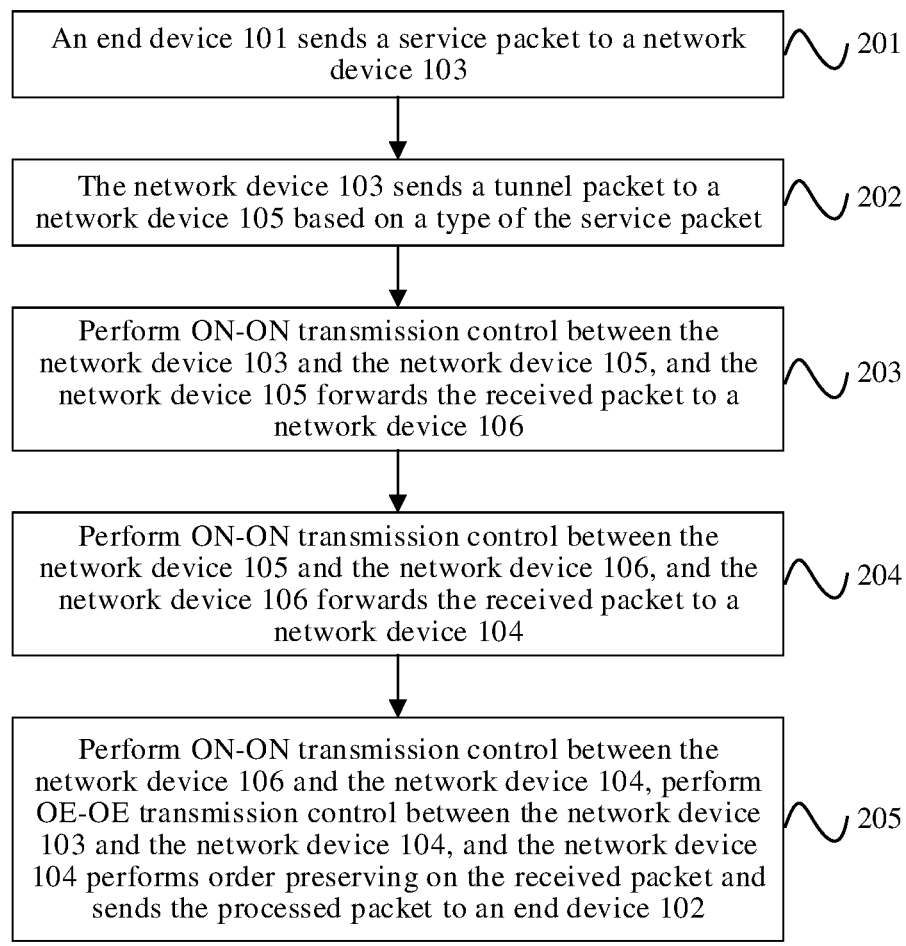
FIG. 2 is a schematic flowchart of a packet processing method according to an embodiment of the present invention.

FIG. 2 is a schematic flowchart of a packet processing method according to an embodiment of the present invention. A service packet requiring a high throughput is processed in this embodiment. To improve throughput performance, both OE-OE-level packet loss-triggered retransmission and ON-ON-level packet loss-triggered retransmission are performed.

S201: An end device 101 sends a service packet to a network device 103.

S202: The network device 103 sends a tunnel packet to a network device 105 based on a type of the service packet.

The network device 103 uses the service packet as a payload and adds a control packet header to obtain the tunnel packet. A format of the control packet header is shown in Table 1.

In this embodiment of the present invention, for ease of understanding, an ON-ON-level packet number of a packet 1 is 1, and an OE-OE-level packet number of the packet 1 is 11. An ON-ON-level packet number of a packet 2 is 2, and an OE-OE-level packet number of the packet 2 is 12. An ON-ON-level packet number of a packet 3 is 3, and an OE-OE-level packet number of the packet 3 is 13.

The type of the service packet is a high-throughput type. Therefore, a packet loss-triggered retransmission operation is performed. For the packets 1, 2, and 3, a tunnel type field is set to the high-throughput type, a retransmission indication field is set to 50, and a path ID field is set to an ID of a first path.

S203: Perform ON-ON transmission control between the network device 103 and the network device 105, and the network device 105 forwards the received packet to a network device 106.

The performing ON-ON transmission control between the network device 103 and the network device 105 mainly includes feeding back, by the network device 105, an acknowledgement packet, performing, by the network device 103, packet loss-triggered retransmission based on the acknowledgement packet, and obtaining, by the network device 103, a status of a network between the network device 103 and the network device 105 based on the acknowledgement packet.

The network device 105 sends the acknowledgement packet to the network device 103 based on an ON-ON-level packet number field in the control packet header. A control packet header of the acknowledgement packet is shown in Table 2. An acknowledgement packet may be sent for each tunnel packet, may be sent after a preset quantity of tunnel packets are received, or may be sent after a preset time. This is not limited in this embodiment of the present invention.

The network device 105 receives the packets whose ON-ON-level packet numbers are 1 and 3, and does not receive the packet whose ON-ON-level packet number is 2. In this case, in the control packet header of the acknowledgement packet, an ON-ON-level acknowledgement packet number is 3, an ON-ON-level echo timestamp is a timestamp of the ON-ON-level packet number carried in the packet 3, a quantity of negative acknowledgment packets is 1, and a list of the negative acknowledgment packets includes the packet number 2.

The network device 103 determines, based on the acknowledgement packet of the network device 105, whether a packet loss occurs. If determining that the network device 105 does not receive the packet 2, the network device 103 updates a field indicating a timestamp of the ON-ON-level packet number and the retransmission indication field in a control packet header of the packet 2, and then retransmits the packet 2. Assuming that a retransmission time is 10, the retransmission indication field in the packet 2 retransmitted by the network device 103 is set to 40 (50−10).

The network device 103 may obtain the status of the network between the network device 103 and the network device 105 based on the acknowledgement packet of the network device 105. For example, the network device 103 may obtain an RTT between the network device 103 and the network device 105 through calculation based on the ON-ON-level echo timestamp, and may further obtain a packet loss rate between the network device 103 and the network device 105 based on a packet loss status.

After the network device 103 obtains the RTT between the network device 103 and the network device 105, when subsequently sending a packet, the network device 103 may set an OE-OE-level round-trip time latency field based on a value of the RTT. After receiving the packet, the network device 105 updates the OE-OE-level round-trip time latency field based on an RTT between the network device 105 and the network device 106, that is, accumulates the original RTT value and the RTT between the network device 105 and the network device 106. A subsequent network device performs a similar operation. In this way, an OE-OE-level receiving node can obtain an OE-OE-level round-trip time latency, and may feed back the OE-OE-level round-trip time latency to an OE-OE-level sending node.

The network device 105 forwards the received packet to the network device 106. When forwarding the tunnel packet, the network device 105 updates a time to live field, the ON-ON-level packet number field, a field indicating a timestamp of an ON-ON-level packet number, and a current-hop field in the control packet header. The network device 105 refreshes the ON-ON-level packet number field in the control packet header. Therefore, before the packet 2 is successfully retransmitted, the network device 105 may directly forward the received packet 3, and an ON-ON-level packet number field in the packet 3 forwarded by the network device 105 indicates a new number. The new number is a number of a packet between the network device 105 and the network device 106.

If a packet is not retransmitted between the network device 103 and the network device 105, a retransmission indication field in the packet forwarded by the network device 105 remains unchanged (still 50), for example, the packet 1 and the packet 3. If a packet is retransmitted between the network device 103 and the network device 105, a retransmission indication field in the packet forwarded by the network device 105 changes, for example, the packet 2 (a value of the retransmission indication field changes to 40). When determining that the network device 106 does not receive the packet 2, the network device 105 determines, based on the new value (40), whether retransmission is allowed.

The network device 105 establishes communication between the network device 105 and the network device 106, including maintaining the number of the packet, a retransmission queue, a retransmission timer, and the like between the two network devices.

In this embodiment of the present invention, when retransmission and forwarding operations are performed on a packet, a packet payload does not change, and a control packet header generally needs to be updated.

S204: Perform ON-ON transmission control between the network device 105 and the network device 106, and the network device 106 forwards the received packet to a network device 104.

This step is similar to the step 203.

S205: Perform ON-ON transmission control between the network device 106 and the network device 104, perform OE-OE transmission control between the network device 103 and the network device 104, and the network device 104 performs order preserving on the received packet and sends the processed packet to an end device 102.

The performing ON-ON transmission control between the network device 106 and the network device 104 is similar to that in the step 203.

The performing OE-OE transmission control between the network device 103 and the network device 104 mainly includes feeding back, by the network device 104, an acknowledgement packet, performing, by the network device 103, packet loss-triggered retransmission based on the acknowledgement packet, and obtaining, by the network device 103, a status of a network between the network device 103 and the network device 104 based on the acknowledgement packet.

The network device 104 sends the acknowledgement packet to the network device 103 based on an OE-OE-level packet number field in a control packet header. A control packet header of the acknowledgement packet is shown in Table 3. An acknowledgement packet may be sent for each tunnel packet, may be sent after a preset quantity of tunnel packets are received, or may be sent after a preset time. This is not limited in this embodiment of the present invention.

The network device 104 receives the packets whose OE-OE-level packet numbers are 11 and 13, and does not receive the packet whose OE-OE-level packet number is 12. In this case, in the control packet header of the acknowledgement packet, an OE-OE-level acknowledgement packet number is 13, an OE-OE-level echo timestamp is a timestamp of the OE-OE-level packet number carried in the packet 3, a quantity of negative acknowledgment packets is 1, a list of the negative acknowledgment packets includes the packet number 12, a tunnel type is the high-throughput type, a path quantity is 1, an OE-OE-level RTT is an OE-OE-level RT carried in the received packet 3, and a path attribute includes an attribute of the first path.

The network device 103 determines, based on the acknowledgement packet of the network device 104, whether a packet loss occurs. If determining that the packet loss occurs, the network device 103 performs packet loss-triggered retransmission. If determining that the network device 104 does not receive the packet whose OE-OE-level acknowledgement packet number is 12, the network device 103 retransmits the packet whose OE-OE-level acknowledgement packet number is 12.

The network device 103 may obtain the status of the network between the network device 103 and the network device 104 based on the acknowledgement packet of the network device 104. For example, the network device 103 may obtain an RTT between the network device 103 and the network device 104 through calculation based on the OE-OE-level echo timestamp, and may further obtain a packet loss rate between the network device 103 and the network device 104 based on a packet loss status. Multipath concurrent transmission is used. Therefore, the status of the network between the network device 103 and the network device 104 may be obtained and fed back directly by the network device 104. A path attribute field in this embodiment of the present invention carries a status of the first path. The OE-OE-level RTT is obtained based on an OE-OE-level RT field.

The network device 103 may perform further transmission control based on network statuses of the network device 103 and the network device 104. For example, a specific path for forwarding a packet may be selected, and the packet may be switched to a second path for transmission. For a decision on transmission control, refer to a network status obtained based on an OE-OE-level acknowledgment packet, or refer to a network status obtained based on an ON-ON-level acknowledgment packet. The network status needs to be sent by an ON-ON-level sending node to an OE-OE-level sending node.

The network device 104 performs the order preserving on the received packet, and then sends the processed packet to the end device 102.

In a process in which a packet such as the packet 1, the packet 2, or the packet 3 is transmitted in a segmented network 100, a control packet header may change, and generally, a control packet payload does not change. An OE-OE-level packet number in the control packet header does not change. Therefore, an OE-OE-level receiving node performs, based on the number, operations such as packet loss detection and sending an acknowledgement packet to an OE-OE-level sending node. An ON-ON-level packet number in the control packet header is updated hop by hop. Therefore, the ON-ON-level receiving node and sending node can perform, based on a new ON-ON-level packet number, operations such as network status confirmation and packet loss-triggered retransmission. A timestamp of the OE-OE-level packet number in the control packet header is updated when OE-OE-level packet retransmission occurs. A timestamp of the ON-ON-level packet number in the control packet header is updated when ON-ON-level packet retransmission occurs. A retransmission indication field in the control packet header is updated when the ON-ON-level packet retransmission occurs.

When forwarding a packet such as the packet 1, the packet 2, or the packet 3, a network device in the segmented network 100 may modify a current-hop field, forward the packet with reference to a forwarding path field. Assuming that the segmented network 100 forwards a packet by using an IP protocol, a lower layer of a control packet header further includes an IP packet header, a source IP address of the IP packet header is an IP address of an ON-ON-level sending node, and a destination IP address of the IP packet header is an IP address of an ON-ON-level receiving node. The control packet header includes a field indicating a forwarding path between OEs and a current-hop field. A forwarding node obtains an IP address of a next hop based on the current-hop field and the forwarding path field, and then when forwarding a corresponding packet, updates an IP packet header of the packet based on an IP address of the local node and the IP address of the next hop. If the segmented network 100 forwards the packet by using another protocol, a corresponding forwarding operation may also be performed based the current-hop field and the forwarding path field.

In a possible design, only OE-OE-level packet loss-triggered retransmission or only ON-ON-level packet loss-triggered retransmission may be performed, or packet loss-triggered retransmission may be performed only between specific ONs.

In a possible design, retransmission is not triggered based on confirmation of a packet loss. For example, in the step 203, the network device 103 may set a timer for the packet 1. When the timer expires and no acknowledgement packet from the network device 105 is received, it is highly likely that a packet loss occurs, and retransmission may also be triggered in this case.

Figure 3:
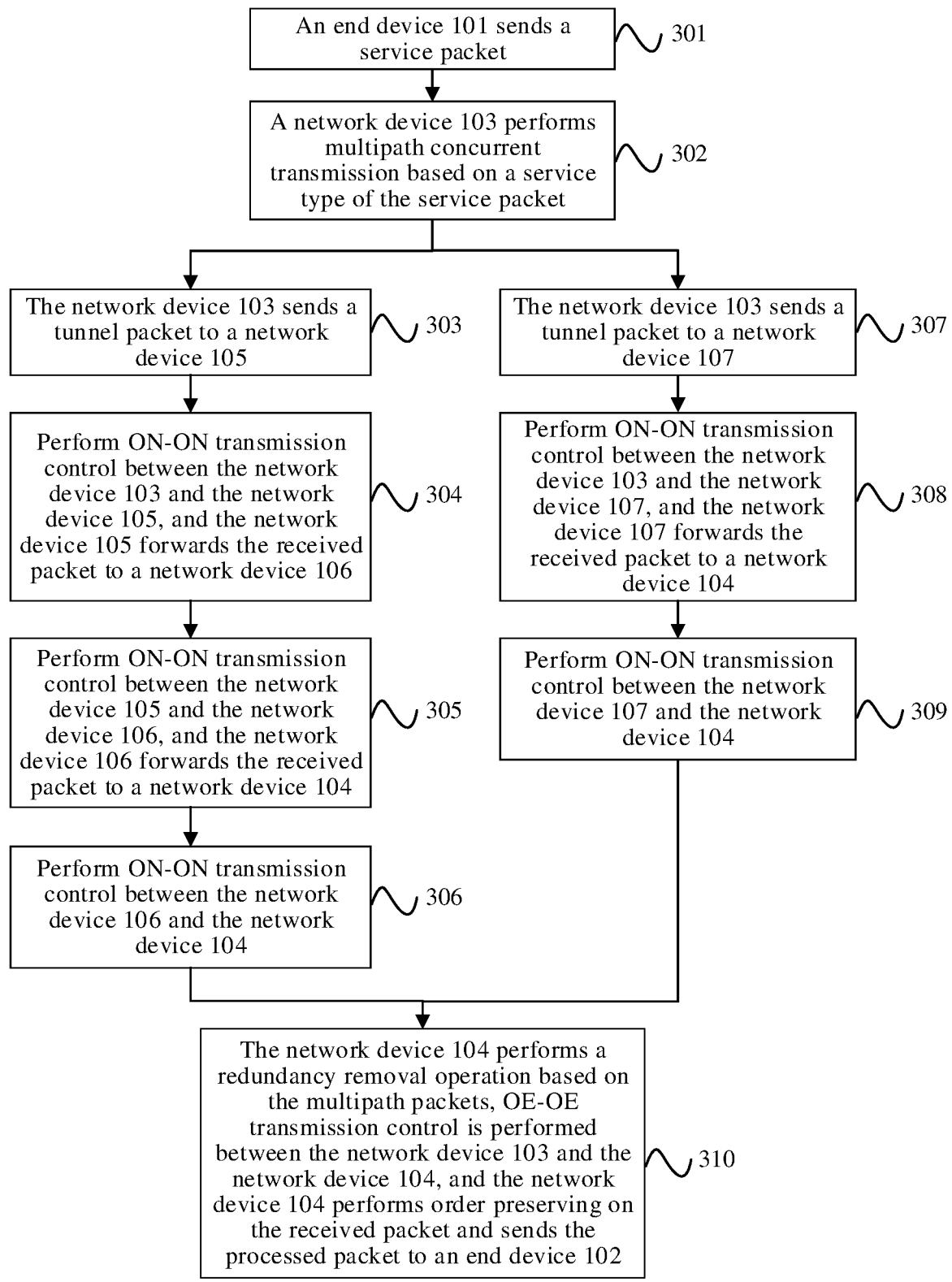
FIG. 3 is a schematic flowchart of another packet processing method according to an embodiment of the present invention.

FIG. 3 is a schematic flowchart of a packet processing method according to an embodiment of the present invention. A service packet requiring a low latency is processed in this embodiment of the present invention. For the service packet requiring the low latency, neither OE-OE-level packet loss-triggered retransmission nor ON-ON-level packet loss-triggered retransmission is performed in this embodiment of the present invention. To reduce packet losses, multipath concurrent transmission is performed, a network status of each path is confirmed based on a feedback packet, and multipath selection is determined based on the network status. For example, mobile game applications have low throughput requirements but are sensitive to a latency and a packet loss. The multipath concurrent transmission can meet the requirements of the mobile game applications.

S301: An end device 101 sends a service packet.

S302: A network device 103 performs the multipath concurrent transmission based on a service type of the service packet.

The network device 103 confirms that the type of the service packet is a low-latency type, determines to perform the multipath concurrent transmission, and forwards the service packet to a network device 104 by using a first path and a second path. Concurrent transmission may be completely repeated multipath packet sending, or may be concurrent transmission in a manner such as through multipath forward error correction (Forward Error Correction, FEC) or multipath network coding. During the concurrent transmission, packets with a same payload on the two paths use a same OE-OE-level packet number. After receiving the packets from the two paths, the network device 104 may perform an operation of removing a redundant packet from the packets with the same OE-OE-level packet number.

S303: The network device 103 sends a tunnel packet to a network device 105.

The network device 103 uses the service packet as a payload and adds a control packet header to obtain the tunnel packet. A format of the control packet header is shown in Table 1.

In this embodiment of the present invention, for ease of understanding, an ON-ON-level packet number of a packet 1 is 1, and an OE-OE-level packet number of the packet 1 is 11. An ON-ON-level packet number of a packet 2 is 2, and an OE-OE-level packet number of the packet 2 is 12. An ON-ON-level packet number of a packet 3 is 3, and an OE-OE-level packet number of the packet 3 is 13.

The type of the service packet is the low-latency type. Therefore, a packet loss-triggered retransmission operation is not performed. For the packets 1, 2, and 3, a tunnel type field is set to the low-latency type, a retransmission indication field is set to 0, and a path ID field is set to an ID of the first path.

S304: Perform ON-ON transmission control between the network device 103 and the network device 105, and the network device 105 forwards the received packet to a network device 106.

The performing ON-ON transmission control between the network device 103 and the network device 105 mainly includes feeding back, by the network device 105, an acknowledgement packet, and obtaining, by the network device 103, a status of a network between the network device 103 and the network device 105 based on the acknowledgement packet.

The network device 105 sends the acknowledgement packet to the network device 103 based on an ON-ON-level packet number field in the control packet header. A control packet header of the acknowledgement packet is shown in Table 2. An acknowledgement packet may be sent for each tunnel packet, may be sent after a preset quantity of tunnel packets are received, or may be sent after a preset time. This is not limited in this embodiment of the present invention.

The network device 105 receives the packets whose ON-ON-level packet numbers are 1 and 3, and does not receive the packet whose ON-ON-level packet number is 2. In this case, in the control packet header of the acknowledgement packet, an ON-ON-level acknowledgement packet number is 3, an ON-ON-level echo timestamp is a timestamp of the ON-ON-level packet number carried in the packet 3, a quantity of negative acknowledgment packets is 1, and a list of the negative acknowledgment packets includes the packet number 2.

The network device 103 determines, based on the acknowledgement packet of the network device 105, whether a packet loss occurs. When the packet loss occurs, the network device 103 does not perform packet loss-triggered retransmission. However, the network device 103 may obtain the status of the network between the network device 103 and the network device 105 based on the acknowledgement packet of the network device 105, for example, may obtain an RTT between the network device 103 and the network device 105 through calculation based on the ON-ON-level echo timestamp, and may further obtain a packet loss rate between the network device 103 and the network device 105 based on a packet loss status.

The network device 105 forwards the received packet to the network device 106. When forwarding the tunnel packet, the network device 105 updates a time to live field, the ON-ON-level packet number field, a field indicating a timestamp of an ON-ON-level packet number, and a current-hop field in the control packet header. The network device 105 refreshes the ON-ON-level packet number field in the control packet header. Therefore, before the packet 2 is successfully retransmitted, the network device 105 may directly forward the received packet 3, and an ON-ON-level packet number field in the packet 3 forwarded by the network device 105 indicates a new number. The new number is a number of a packet between the network device 105 and the network device 106.

S305: Perform ON-ON transmission control between the network device 105 and the network device 106, and the network device 106 forwards the received packet to the network device 104.

This step is similar to the step 304.

S306: Perform ON-ON transmission control between the network device 106 and the network device 104.

This step is similar to the step 304.

S307: The network device 103 sends a tunnel packet to a network device 107.

The network device 103 uses the service packet as a payload and adds a control packet header to obtain the tunnel packet. A format of the control packet header is shown in Table 1.

In this embodiment of the present invention, for ease of understanding, an ON-ON-level packet number of a packet 11 is 11, and an OE-OE-level packet number of the packet 11 is 11. An ON-ON-level packet number of a packet 12 is 112, and an OE-OE-level packet number of the packet 12 is 12. An ON-ON-level packet number of a packet 13 is 113, and an OE-OE-level packet number of the packet 13 is 13. A payload of the packet 11 is the same as that of the packet 1 in the step 303. Therefore, the same OE-OE-level packet number 11 is used. A payload of the packet 12 is the same as that of the packet 2 in the step 303. Therefore, the same OE-OE-level packet number 12 is used. A payload of packet 13 is the same as that of the packet 3 in the step 303. Therefore, the same OE-OE-level packet number 13 is used.

The type of the service packet is the low-latency type. Therefore, a packet loss-triggered retransmission operation is not performed. For the packets 11, 12, and 13, a tunnel type field is set to the low-latency type, a retransmission indication field is set to 0, and a path ID field is set to an ID of the second path.

S308: Perform ON-ON transmission control between the network device 103 and the network device 107, and the network device 107 forwards the received packet to the network device 104.

This step is similar to the step 304.

S309: Perform ON-ON transmission control between the network device 107 and the network device 104.

This step is similar to the step 304.

S310: The network device 104 performs redundancy removal and reordering operations based on the multipath packets. Perform OE-OE transmission control between the network device 103 and the network device 104, and the network device 104 performs order preserving on the received packet and sends the processed packet to an end device 102.

The network device 104 receives the packet from the first path and the second path, and performs redundancy removal and reordering based on an OE-OE-level packet number field in the packet.

The performing OE-OE transmission control between the network device 103 and the network device 104 mainly includes feeding back, by the network device 104, an acknowledgement packet, and obtaining, by the network device 103, a status of a network between the network device 103 and the network device 104 based on the acknowledgement packet.

The network device 104 sends the acknowledgement packet to the network device 103 based on the OE-OE-level packet number field in the control packet header. A control packet header of the acknowledgement packet is shown in Table 3. An acknowledgement packet may be sent for each tunnel packet, may be sent after a preset quantity of tunnel packets are received, or may be sent after a preset time. This is not limited in this embodiment of the present invention.

The network device 104 receives the packets whose OE-OE-level packet numbers are 11 and 13, and does not receive the packet whose OE-OE-level packet number is 12. In this case, in the control packet header of the acknowledgement packet, an OE-OE-level acknowledgement packet number is 13, an OE-OE-level echo timestamp is a timestamp of the OE-OE-level packet number carried in the packet 3, a quantity of negative acknowledgment packets is 1, a list of the negative acknowledgment packets includes the packet number 12, a tunnel type is the low-latency type, a path quantity is 2, an OE-OE-level RTT is an OE-OE-level RTT carried in the received packet 3, and a path attribute includes attributes of the first path and the second path.

The network device 103 determines, based on the acknowledgement packet of the network device 105, whether a packet loss occurs. When the packet loss occurs, the network device 103 does not perform packet loss-triggered retransmission. However, the network device 103 may obtain the status of the network between the network device 103 and the network device 104 based on the acknowledgement packet of the network device 104, for example, may obtain an RTT between the network device 103 and the network device 104 through calculation based on the OE-OE-level echo timestamp, and may further obtain a packet loss rate between the network device 103 and the network device 104 based on a packet loss status. The multipath concurrent transmission is used. Therefore, the status of the network between the network device 103 and the network device 104 may be obtained and fed back directly by the network device 104. A path attribute field in this embodiment of the present invention carries statuses of the first path and the second path. The OE-OE-level RTT is obtained based on an OE-OE-level RTT field.

The network device 104 performs the order preserving on the received packet, and then sends the processed packet to the end device 102.

In a possible design, payloads of packets transmitted on the first path and the second path are different. Load sharing is performed service packets by using the first path and the second path (for example, a service packet 1, a service packet 3, . . . , and the like are sent by using the first path, and a service packet 2, a service packet 4, . . . , and the like are sent by using the second path), or multipath load sharing may be performed on service packets after FEC and network coding are performed on the service packets. In this way, an end-to-end throughput can be greatly improved.

According to the solution in this embodiment of the present invention, status maintenance and transmission control are performed not based on a flow in a conventional solution, but flows of a same type are converged into a same tunnel for tunnel-based status maintenance and transmission control. This reduces to-be-maintained path statuses of the flows, and enhances transmission, it is easy to implement transmission, and the converging is not perceived by an application or even TCP. The network can use a multipath for efficient transmission to improve service transmission performance and experience. In addition, the network can proactively recover transmission quality in time to improve the service transmission performance and experience. When a type of a service is the low-latency type and a packet loss tolerance is low, a segmented network performs the multipath transmission control for the service, the OE-OE transmission control is OE-OE-level reordering and redundancy removal, and an ON performs a pure forwarding service without retransmission. When a type of a service is the high-throughput type, the segmented network guarantees segmented transmission for the service. Each segment of transmission is stateful. The segmented network performs inband and timely recovery on a perceived service impairment based on these statuses, the OE-OE transmission control is OE-OE-level retransmission and order preserving, and the corresponding ON-ON transmission control is reliable service forwarding based on the retransmission and order preserving.

Figure 4:
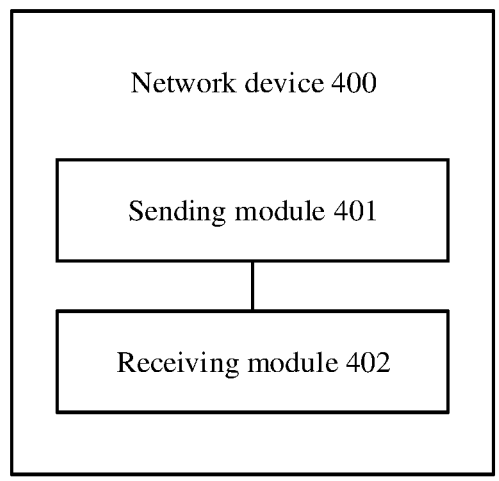
FIG. 4 is a structural block diagram of a network device according to an embodiment of the present invention.

FIG. 4 is a structural block diagram of a network device according to an embodiment of the present invention. The network device 400 in FIG. 4 is a first network device, and may correspond to the foregoing network devices 103, 105, 106, and 107. As shown in FIG. 4, the network device 400 includes a sending module 401 and a receiving module 402.

The sending module 401 is configured to send a first packet to a second network device, where a control packet header of the first packet includes a first number, and the first number is used to indicate a number of the packet that carries the first number and that is between the first network device and the second network device.

The receiving module 402 is configured to receive a first acknowledgement packet from the second network device, where the first acknowledgement packet includes an indication indicating whether the second network device receives the first packet.

The sending module 401 may be implemented by a transmitter. The receiving module 402 may be implemented by a receiver. For specific functions and beneficial effects of the sending module 401 and the receiving module 402, refer to the foregoing embodiments. Details are not described herein again.

Figure 5:
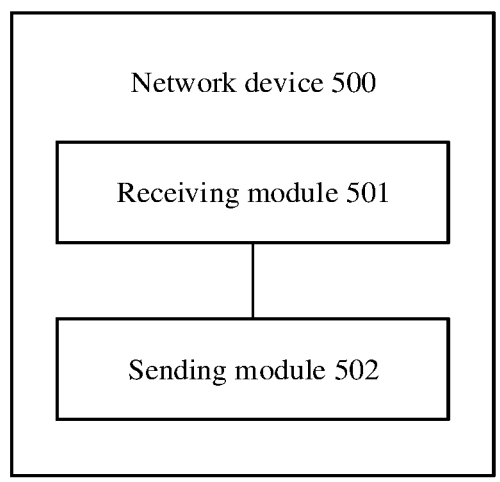
FIG. 5 is a structural block diagram of another network device according to an embodiment of the present invention.

FIG. 5 is a structural block diagram of another network device according to an embodiment of the present invention. The network device 500 in FIG. 5 is a second network device, and may correspond to the foregoing network devices 105, 106, 107, and 104. As shown in FIG. 5, the network device 500 includes a receiving module 501 and a sending module 502.

The receiving module 501 is configured to receive a first packet from a first network device, where a control packet header of the first packet includes a first number, and the first number is used to indicate a number of the packet that carries the first number and that is between the first network device and the second network device.

The sending module 502 is configured to send a first acknowledgement packet to the first network device, where the first acknowledgement packet includes an indication indicating whether the second network device receives the first packet.

The receiving module 501 may be implemented by a receiver. The sending module 502 may be implemented by a transmitter. For specific functions and beneficial effects of the receiving module 501 and the sending module 502, refer to the method shown in FIG. 3. Details are not described herein again.

Figure 6:
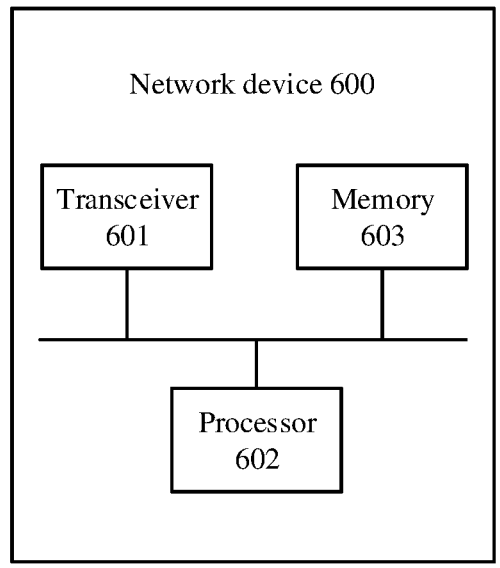
FIG. 6 is a structural block diagram of another network device according to an embodiment of the present invention.

FIG. 6 is a structural block diagram of a network device according to an embodiment of the present invention. The network device 600 in FIG. 6 is a first network device, and may correspond to the foregoing network devices 103, 105, 106, and 107. As shown in FIG. 6, the network device 600 includes a transceiver 601, a processor 602, and a memory 603.

FIG. 6 shows only one memory and one processor. In an actual network device product, there may be one or more processors and one or more memories. The memory may also be referred to as a storage medium, a storage device, or the like. The memory may be disposed independent of the processor, or may be integrated with the processor. This is not limited in this embodiment of this application.

The transceiver 601, the processor 602, and the memory 603 communicate with each other through an internal connection path, to transfer a control signal and/or a data signal.

The methods disclosed in the foregoing embodiments of the present invention may be applied to the transceiver 601, or implemented by the transceiver 601.

Specifically, the transceiver 601 is configured to send a first packet to a second network device, where a control packet header of the first packet includes a first number, and the first number is used to indicate a number of the packet that carries the first number and that is between the first network device and the second network device, and receive a first acknowledgement packet from the second network device, where the first acknowledgement packet includes an indication indicating whether the second network device receives the first packet.

For a specific working process and beneficial effects of the network device 600, refer to the descriptions in the foregoing embodiments.

Figure 7:
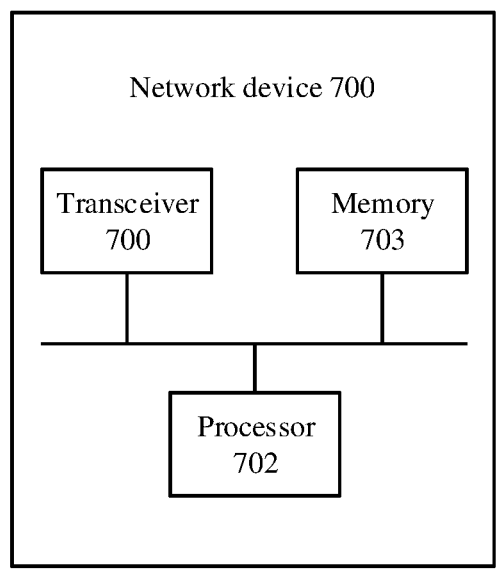
FIG. 7 is a structural block diagram of another network device according to an embodiment of the present invention.

FIG. 7 is a structural block diagram of another network device according to an embodiment of the present invention. The network device 700 in FIG. 7 is a second network device, and may correspond to the foregoing network devices 105, 106, 107, and 104. As shown in FIG. 7, the network device 700 includes a transceiver 701, a processor 702, and a memory 703.

FIG. 7 shows only one memory and one processor. In an actual network device product, there may be one or more processors and one or more memories. The memory may also be referred to as a storage medium, a storage device, or the like. The memory may be disposed independent of the processor, or may be integrated with the processor. This is not limited in this embodiment of this application.

The transceiver 701, the processor 702, and the memory 703 communicate with each other through an internal connection path, to transfer a control signal and/or a data signal.

The methods disclosed in the foregoing embodiments of the present invention may be applied to the transceiver 701, or implemented by the transceiver 701. Specifically, the transceiver 701 is configured to receive a first packet from a first network device, where a control packet header of the first packet includes a first number, and the first number is used to indicate a number of the packet that carries the first number and that is between the first network device and the second network device, and send a first acknowledgement packet to the first network device, where the first acknowledgement packet includes an indication indicating whether the second network device receives the first packet.

For a specific working process and beneficial effects of the network device 700, refer to the descriptions in the foregoing embodiments.

The transceiver described in the embodiments of this application may also be referred to as a transceiver unit, a transceiver, a transceiver apparatus, or the like. The processor may also be referred to as a processing unit, a processing board, a processing module, a processing apparatus, or the like. Optionally, a component that is in the transceiver and that is configured to implement a receiving function may be considered as a receiving unit, and a component that is in the transceiver and that is configured to implement a sending function may be considered as a sending unit. In other words, the transceiver includes the receiving unit and the sending unit. The receiving unit sometimes may also be referred to as a receiver machine, a receiver, a receiver circuit, or the like. The sending unit sometimes may also be referred to as a transmitter machine, a transmitter, a transmitter circuit, or the like.

The memory in the embodiments of this application is configured to store a computer instruction and a parameter that are required for running the processor.

The processor in the embodiments of the present invention may be an integrated circuit chip, and has a signal processing capability. In an implementation process, steps in the foregoing methods can be implemented by using a hardware integrated logic circuit in the processor, or by using instructions in a form of software. The processor in the embodiments of this application may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of the present invention. The general-purpose processor may be a microprocessor, or the processor may be any conventional processor or the like. Steps of the methods disclosed with reference to the embodiments of the present invention may be directly executed and accomplished by using a hardware decoding processor, or may be executed and accomplished by using a combination of hardware and software modules in the decoding processor. A software module may be located in a mature storage medium in the art, such as a random access memory (RAM), a flash memory, a read-only memory (ROM), a programmable read-only memory, an electrically erasable programmable memory, or a register. The storage medium is located in a memory, and a processor reads instructions in the memory and completes the steps in the foregoing methods in combination with hardware of the processor.

Sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

All or some of the foregoing embodiments may be implemented by using software, hardware, firmware, or any combination thereof. When the software is used to implement the embodiments, the embodiments may be all or partially implemented in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state disk (SSD)), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    sending, by a first network device, a first packet to a second network device, wherein a control packet header of the first packet comprises a first number, and the first number is a number of the first packet in a process of transmitting the first packet between the first network device and the second network device, wherein the second network device is an intermediate overlay node on a forwarding path between a source edge node and a destination edge node, and wherein each node on the forwarding path that receives the first packet updates a value of the first number according to a current number of a packet transmitted between the respective sending node and the respective receiving node; and
    receiving, by the first network device, a first acknowledgement packet from the second network device, wherein the first acknowledgement packet comprises an indication indicating whether the second network device receives the first packet;
    wherein the control packet header of the first packet further comprises:
        a forwarding path field;
        a field indicating a location of the first network device on the forwarding path; and
        a tunnel type field; and
    wherein packets of different tunnel types correspond to different first number queues, and wherein the first packet further comprises an internet protocol (IP) packet header, the control packet header is an upper-layer packet header of the IP packet header, a source IP address of the IP packet header is an IP address of the first network device, and a destination IP address of the IP packet header is an IP address of the second network device.

2. The method according to claim 1, further comprising: re-sending the first packet to the second network device.

3. The method according to claim 2, wherein the first packet comprises retransmission indication information, the retransmission indication information indicates whether the second network device is allowed to retransmit the first packet to another intermediate overlay node on the forwarding path, and when the first packet is retransmitted, the retransmitted first packet comprises updated retransmission indication information.

4. The method according to claim 2, wherein the control packet header of the first packet further comprises a timestamp of the first number, the timestamp of the first number indicates a time point at which the first network device sends the first packet, and when the first packet is retransmitted on the forwarding path, the retransmitted first packet comprises an updated timestamp of the first number.

5. The method according to claim 1, further comprising:
    obtaining, by the first network device, a status of a network between the first network device and the second network device based on the first acknowledgement packet.

6. The method according to claim 1, wherein a packet header of the first packet further comprises a second number, and the second number is a number of the first packet in a process of transmitting the first packet between a third network device and a fourth network device, wherein the packet header of the first packet further comprises a timestamp of the second number, and the timestamp of the second number indicates a time point at which the third network device sends the first packet that carries the second number.

7. The method according to claim 6, wherein:
the second network device is located between the first network device and the fourth network device; and
wherein the method further comprises:
receiving, by the first network device, a second acknowledgement packet from the fourth network device, wherein the second acknowledgement packet comprises an indication indicating whether the fourth network device receives the first packet.

8. The method according to claim 7, further comprising:
re-sending, by the first network device, the first packet to the fourth network device.

9. The method according to claim 7, wherein the first packet comprises retransmission indication information, the retransmission indication information indicates whether the fourth network device is allowed to retransmit the first packet, and when the first packet is retransmitted, the retransmitted first packet comprises updated retransmission indication information; and
wherein the method further comprises:
obtaining, by the first network device, a status of a network between the first network device and the fourth network device based on the second acknowledgement packet.

10. The method according to claim 6, wherein the third network device and the first network device are a same network device, the second network device is a network device on a first path between the first network device and the fourth network device, a fifth network device is a network device on a second path between the first network device and the fourth network device, and the method further comprises:
sending, by the first network device, a fifth packet to the fifth network device, wherein a control packet header of the fifth packet comprises a fifth number and the second number, the fifth number is a number of the fifth packet in a process of transmitting the fifth packet between the first network device and the fifth network device, and payloads of the first packet and the fifth packet are the same.

11. The method according to claim 6, wherein the third network device and the first network device are different network devices, the first network device is located between the third network device and the fourth network device, and before sending the first packet to the second network device, the method further comprises:
receiving, by the first network device, a second packet from an upstream network device, wherein a control packet header of the second packet comprises the second number and a third number, and the third number is a number of the second packet in a process of transmitting the second packet between the upstream network device and the first network device; and
modifying, by the first network device, the third number in the control packet header of the second packet to the first number, to obtain the first packet.

12. The method according to claim 11, further comprising:
sending, by the first network device, a third acknowledgement packet to the upstream network device, wherein the third acknowledgement packet comprises an indication indicating whether the second network device receives the second packet.

13. The method according to claim 11, wherein the control packet header of the second packet further comprises an accumulated round-trip time latency field, and wherein obtaining the first packet further comprises:
updating the accumulated round-trip time latency field in the control packet header of the second packet based on a round-trip time latency between the first network device and the second network device, to obtain the first packet.

14. A method, comprising:
receiving, by a second network device, a first packet from a first network device, wherein a control packet header of the first packet comprises a first number, and the first number is a number of the first packet in a process of transmitting the first packet between the first network device and the second network device, wherein the second network device is an intermediate overlay node on a forwarding path between a source edge node and a destination edge node, and wherein each node on the forwarding path updates a value of the first number according to a current number of a packet transmitted between the respective sending node and the respective receiving node; and
sending, by the second network device, a first acknowledgement packet to the first network device, wherein the first acknowledgement packet comprises an indication indicating that the second network device has received the first packet;
wherein the control packet header of the first packet further comprises:
a forwarding path field;
a field indicating a location of the first network device on the forwarding path; and
a tunnel type field; and
wherein packets of different tunnel types correspond to different first number queues, and wherein the first packet further comprises an internet protocol (IP) packet header, the control packet header is an upper-layer packet header of the IP packet header, a source IP address of the IP packet header is an IP address of the first network device, and a destination IP address of the IP packet header is an IP address of the second network device.

15. The method according to claim 14, wherein the control packet header of the first packet further comprises a timestamp of the first number, and the timestamp of the first number indicates a time point at which the first network device sends the first packet.

16. The method according to claim 15, wherein the control packet header of the first packet further comprises the first number and the timestamp of the first number.

17. A network device, wherein the network device is configured to act as a first network device, and the network device comprises:
a transmitter, configured to send a first packet to a second network device, wherein a control packet header of the first packet comprises a first number, and the first number is a number of the first packet in a process of transmitting the first packet between the first network device and the second network device, wherein the second network device is an intermediate overlay node on a forwarding path between a source edge node on a destination edge node, and wherein each node on the forwarding path updates a value of the first number according to a current number of a packet transmitted between the respective sending node and the respective receiving node; and a receiver, configured to receive a first acknowledgement packet from the second network device, wherein the first acknowledgement packet comprises an indication indicating whether the second network device receives the first packet;

wherein the control packet header of the first packet further comprises:
   a forwarding path field;
   a field indicating a location of the first network device on the forwarding path; and
   a tunnel type field; and wherein packets of different tunnel types correspond to different first number queues, and wherein the first packet further comprises an internet protocol (IP) packet header, the control packet header is an upper-layer packet header of the IP packet header, a source IP address of the IP packet header is an IP address of the first network device, and a destination IP address of the IP packet header is an IP address of the second network device.

18. The device according to claim 17, wherein the transmitter is further configured to re-send the first packet to the second network device.

19. The device according to claim 18, wherein the first packet comprises retransmission indication information, the retransmission indication information indicates whether the second network device is allowed to retransmit the first packet, and when the first packet is retransmitted, the retransmitted first packet comprises updated retransmission indication information.

* * * * *